United States Patent [19] [11] 4,136,241
Ammann [45] Jan. 23, 1979

[54] FLEXIBLE POLYURETHANE FOAMS BASED UPON THE USE OF A SOLUBLE AMINE SALT AS CROSSLINKING AGENT

[75] Inventor: Rudolf Ammann, Thalwil, Switzerland

[73] Assignee: The Dow Chemical Company, Midland, Mich.

[21] Appl. No.: 889,808

[22] Filed: Mar. 24, 1978

Related U.S. Application Data

[63] Continuation-in-part of Ser. No. 627,489, Oct. 30, 1976, abandoned.

[51] Int. Cl.$^2$ .................... C08G 18/14; C08G 18/32; C08G 18/34; C08G 18/30
[52] U.S. Cl. .................... 521/163; 521/120; 521/127; 521/129; 521/174
[58] Field of Search ............... 260/2.5 AM, 77.5 AM, 260/2.5 BD

[56] References Cited

U.S. PATENT DOCUMENTS

| | | | |
|---|---|---|---|
| 3,425,964 | 2/1969 | Stanley | 260/77.5 AM |
| 3,478,089 | 11/1969 | Ogura et al. | 260/501.2 |
| 3,511,814 | 5/1970 | Ogura et al. | 260/77.5 AM |
| 3,573,255 | 3/1971 | Cyba | 260/2.5 AC |
| 3,607,837 | 9/1971 | Reegen et al. | 260/77.5 AM |
| 3,609,112 | 9/1971 | Schroeder et al. | 260/77.5 AM |
| 3,635,908 | 1/1972 | Vogt et al. | 260/2.5 AM |
| 3,644,235 | 2/1972 | Gray | 260/2.5 AM |
| 4,048,102 | 9/1977 | Quock et al. | 260/2.5 AM |
| 4,054,556 | 10/1977 | VanGulick | 260/2.5 AM |
| 4,075,150 | 2/1978 | Hoeschele | 260/2.5 AM |

*Primary Examiner*—H.S. Cockeram
*Attorney, Agent, or Firm*—H. David Russell

[57] ABSTRACT

In a process for producing polyurethane foam, which process comprises reacting in one step a polyether polyol and a crosslinking agent with a polyisocyanate in the presence of a catalyst and a blowing agent, the improvement of employing as at least a major proportion of the crosslinking agent a soluble amine salt obtained by reacting a cycloaliphatic polyamine having at least two primary amine groups with approximately the stoichiometric amount of a carboxylic acid.

10 Claims, No Drawings

FLEXIBLE POLYURETHANE FOAMS BASED UPON THE USE OF A SOLUBLE AMINE SALT AS CROSSLINKING AGENT

CROSS REFERENCE TO RELATED APPLICATION

This application is a continuation-in-part of our co-pending application Ser. No. 627,489, filed Oct. 30, 1976 which has now been abandoned.

BACKGROUND OF THE INVENTION

1. Field of the Invention

Polyurethane foams are used in numerous applications in the furniture and automotive industries. Flexible polyurethane foams suitable for cushioning applications require good load bearing properties while retaining good processing features.

2. Description of the Prior Art

Approaches taken to producing polyurethanes, particularly in the field of high resiliency foams with improved load-bearing properties, include using a styrene-acrylonitrile copolymer polyol to provide additional chain branching which contributes to higher load bearing. A second approach to achieving crosslinking necessary for desired load bearing properties involves the use of isocyanate prepolymers with large amounts of free isocyanate groups with regular polyisocyanates. The first two approaches employ higher cost reactants for the foaming formulation as compared with conventional polyols and polyisocyanates as well as requiring special storage conditions to prevent contamination of other materials. A third approach, and the most commonly tried, is to use low molecular weight amines and hydroxyl containing compounds as crosslinking compounds. Arylene diamines such as those taught in U.S. Pat. No. 3,644,235 are known to increase the load bearing properties of flexible polyurethane foams. Use of arylene diamines such as, for example, 4,4'-methylene-bis-(2-chloroaniline) is declining because of their suspected carcinogenic behavior. The use of carboxylic acid salts of hexamethylene diamine or aromatic diminishes as curing agents is taught in U.S. Pat. Nos. 3,478,089 and 3,511,814.

SUMMARY OF THE INVENTION

It has now been found that polyurethane foam prepared by reacting in one step a polyether polyol and a crosslinking agent with a polyisocyanate in the presence of a catalyst and a blowing agent has improved load bearing properties when a soluble amine salt obtained by reacting a cycloaliphatic polyamine having at least two primary amine groups with a carboxylic acid is employed as at least a major proportion of the crosslinking agent.

While the invention is not predicated on theory, it is believed that the amine salt acts as a latent crosslinking agent. Instead of primary amine groups reacting preferentially with the isocyanate groups early in the reaction, the amine-isocyanate reaction is delayed until the heat of the reaction causes the amine salt to dissociate. The delayed reaction allows the crosslinking to take place in the latter stages of the reaction. Polyurethane foam recipes containing the amine salt give foams characterized by improved load bearing properties, such as compression and indentation load deflection.

DESCRIPTION OF THE INVENTION

The process according to the invention will now be described in more detail with respect to preparation of polyurethane foams by reacting as essential ingredients (A) crosslinking agent, (B) polyether polyol, (C) polyisocyanate, (D) catalyst, and (E) blowing agent. Optionally, one or more cell control agents may be utilized. Other agents, optionally used in the production of polyurethane foams, may also be included for special desired effects.

A. Crosslinking Agent

The special crosslinking agents of the present invention are soluble amine salts obtained by reacting a cycloaliphatic polyamine having at least two primary amine groups with a carboxylic acid. The amine salt is soluble either in the polyol component or in water. In addition to carbon, hydrogen and nitrogen, suitable amines may optionally contain elements, such as, for example, oxygen, sulfur, and halogens. Examples of cycloaliphatic amines include 1,3-diaminocyclohexane and aminocyclohexanemethanamines such as, for example, menthanediamine (4-amino-$\alpha,\alpha$,-4-trimethylcyclohexanemethanamine) and isophoronediamine (3-amino-3,5,5-trimethylcyclohexanemethanamine). Preferably, the polyamine is an aminocyclohexanemethanamine. More preferably, the polyamine is isophoronediamine.

In addition to carbon, hydrogen, and oxygen, suitable carboxylic acids may optionally contain elements such as, for example, nitrogen, sulfur, and halogens. Suitable acids include aliphatic and aromatic mono- and polycarboxylic acids having a melting point above 25° C. Examples of aliphatic acids include oxalic acid, malonic acid, maleic acid, succinic acid, glutaric acid, adipic acid, pimelic acid, and tricarballyic acid. Examples of aromatic acids include benzoic and phthalic acid. Preferably the carboxylic acid contains from two to thirty carbon atoms, particularly three to ten carbons. More preferably, the carboxylic acid is an aliphatic dicarboxylic acid containing from four to six carbon atoms. Most preferably, the carboxylic acid is succinic acid, adipic acid or mixtures thereof.

The amine salt is preferably prepared as an aqueous solution by dissolving the amine in water and adding approximately the stoichiometric equivalent amount of acid. As water is usually metered into the mixing chamber of a foam head, it is preferable to prepare the aqueous amine salt solution at a concentration such that each unit volume of solution contains the required amount of water and amine salt. This aqueous stream may also contain other components such as, for example, catalyst, cell control agent or additional crosslinking agents.

Alternatively, prior to the reaction with the polyisocyanate, the amine salt crosslinking agent and other usual components are mixed with the polyol. The invention is not based upon a specific concentration range for use of the amine salt crosslinking agent. Generally they are employed in amounts from 0.1 to 10 parts by weight per 100 parts of polyol. Optimum concentrations will vary depending upon the choice of polyamine and carboxylic acid. Optimum results for the isophoronediamine-succinic acid salt and the isophoronediamine-adipic acid salt are obtained when they are employed in the range of 1 to 4 parts by weight per 100 parts of polyol.

As a preferred embodiment, one or more auxiliary crosslinking agents known in the art are added to the foaming formulation with the amine salt crosslinking agent. Auxiliary crosslinking agents include low molecular weight amines and hydroxyl containing compounds such as, for example, tris(polyoxyalkylene alkanol)amines; mono-, di-, and tri-ethanolamines; mono-, di-, and triisopropanolamines; oxyhydrocarbon or oxyhydrocarboxy derivatives of isocyanuric acid or aryl substituted isocyanuric acid; oxydianiline; and aliphatic diol or a polyether diol having an hydroxyl equivalent weight less than 300 and preferably less than 200; and aliphatic, alicyclic and aromatic polyamines having from 1 to about 30 carbon atoms. Advantageously the auxiliary crosslinking agent is the same polyamine as that used to prepare the amine salt. Auxiliary crosslinking agents are generally employed in the range from 0.1 to 5 parts by weight per 100 parts of polyol.

B. Polyether Polyol

Suitable polyether polyols are obtained by reacting an alkylene oxide such as, for example, ethylene oxide, propylene oxide, butylene oxide or a mixture of two or more thereof, with an initiator having a multiplicity of active hydrogen atoms such as, for example, alkylene glycols, glycerol, trimethylol propane, pentaerythritol, sorbitol, hexane triol, sucrose, ethylenediamine, polyalkylenepolyamines, phenol-aldehyde condensates, bisphenol A, or a mixture of two or more thereof. Polyether polyols derived from propylene oxide or a mixture of propylene oxide and ethylene oxide either contain only secondary hydroxyl groups or a mixture of secondary and primary hydroxyl groups. By reacting these polyols with ethylene oxide one can obtain modified polyols having a high primary hydroxyl contant. These modified polyols are described as "capped" or "tipped" polyether polyols and can be used with advantage in the process according to the invention. Suitable polyester polyols have a number average molecular weight range from 200 to 7000, preferably 3000 to 7000. Suitable polyols preferably have a hydroxyl number range from 24 to 56.

C. Polyisocyanate

In preparing the polyurethane foams of the present invention, any of a wide variety of polyisocyanates may be employed either alone, as isomer mixtures, or as mixtures of different polyisocyanates. Aromatic, aliphatic and alicyclic diisocyanates and combinations of these types are useful. Representative polyisocyanates include 2,4-toluenediisocyante (TDI), 2-6-toluenediisocyanate, methylene-bis(p-phenylisocyanate), polymethylene polyphenylisocyanates, crude or undistilled isocyantes, dimers or trimers of polyisocyanates and prepolymers made by the reaction of a stoichiometric excess of such isocyanates with any of the above mentioned polyether polyols or with other compounds having sites reactive with isocyanates. Arylene diisocyanates, i.e. those in which each of the two isocyante groups is attached directly to an aromatic ring, are preferred.

D. Catalyst

Catalyst systems employed include, for example, tertiary amine catalysts such as triethylenediamine, dimethylethanolamine, bis-2(N,N-dimethylaminoethyl) ether, and N-ethylmorpholine, which catalyze the water-isocyanate reaction as well as the hydroxylisocyanate reaction and the usual organo-tin catalysts including stannous octoate. When the process of the invention is used to produce molded flexible polyurethane foams, usually organo-tin catalysts are not incorporated into the foaming formulation. When the process of the invention is used to produce slab stock flexible polyurethane foams, usually organo-tin catalysts are incorporated into the foaming formulation. Sufficient catalyst is used to produce desired foaming parameters such as, for example, cream time and rise time. The optimum concentration of the catalyst system for a given foaming formulation is determined by incrementally adjusting the concentration until the desired conditions are met.

E. Blowing Agent

The density of the foam is varied by using different proportions of a blowing agent. In addition to reasons of commercial considerations, water is the most convenient blowing agent to employ. Water offers an additional advantage as a blowing agent in that it not only undergoes an in situ reaction with the isocyanate group to produce carbon dioxide but also results in urea linkages which serve as crosslinking sites. Other blowing agents which may be employed include methylene chloride and fluorocarbons.

Common cell control agents which may be optionally incorporated in the foaming formulation are exemplified by silicone surfactants, such as, for example, siloxane-glycol copolymers, which are employed to generally improve the miscibility of the components and to aid in controlling the size of the cells in the foam. In the case of high resiliency foams, polydimethylsiloxanes, polyphenylmethylsiloxanes, or low activity polyoxyalkylene-polydimethylsiloxane block copolymers are employed to produce foams with a high proportion of open cells.

The polyurethane foams according to the invention can be made by prepolymer, semi-prepolymer and one-shot foam techniques. Such techniques are well known to those skilled in the art and can be varied depending upon the type of product desired.

In order that the invention be well understood, the following examples are given by way of illustration only. Foam properties were measured according to ASTM D-1564 and D-2406.

EXAMPLES 1 AND 2 — COMPARATIVE RUNS A AND B

Examples of high resilient cold cure polyurethane foams using isophoronediamine-succinic acid amine salt crosslinking agent and isophoronediamine and diethanoloamine as auxiliary crosslinking agents were compared with high resilient foams using Amine 70 as the crosslinking agent. An aqueous solution of the amine salt, hereinafter known as Amine Salt Crosslinking Agent A, was prepared by dissolving isophoronediamine in water and then adding the stoichiometric equivalent amount of succinic acid. Additional isophoronediamine, hereinafter known as Auxiliary Crosslinking Agent E, and diethanolamine, hereinafter known as Auxiliary Crosslinking Agent F, were added to the amine salt solution. The proportions of amine, carboxylic acid and water were equivalent to those desired for the foaming formulation. For Comparative Runs A and B, Amine 70, hereinafter known as Amine Crosslinking Agent C, was dissolved in water in proportions needed for the foaming formulations. Amine 70 is a still bottom product obtained in the reaction of ethylenediamine with ethylene oxide. The polyol used in Examples 1 and 2 and Comparative Runs A and B, hereinafter known as Polyol G, was a commercial polyether triol made by reacting glycerol with propylene oxide and end capping with ethylene oxide. Polyol G has an hydroxyl equivalent weight of 1570 and contains 60 to 80% primary hydroxyl groups. The polyisocyanate used, hereinafter known as Polyisocyanate I, was an 80/20 mixture of 2,4-/2,6-toluenediisocyanate having an isocyanate equivalent weight of 87. A solution containing 33 weight percent triethylenediamine in dipropylene glycol, hereinafter known as Catalyst K, was used as a catalyst in both examples and both comparative runs. Dimethylethanolamine, hereinafter known as Catalyst L, and stannous octoate, hereinafter known as Catalyst P, were additionally used in Comparative Runs A and B. A polydimethylsiloxane, hereinafter known as Cell Control Agent Q, having a molecular weight of about 900 and diluted in a ratio of 1:9 with an isobutyrate plasticizer, was used in both examples and both comparative runs.

In each of the examples the aqueous solution of the amine salt crosslinking agent, the auxiliary crosslinking agent, the polyol, the catalyst and the cell control agent were blended together until the components were equally dispersed. Then the polyisocyanate was added and the foaming formulation stirred for several more seconds. The foaming formulation was then poured into an open container and allowed to rise. The foam was cured at room temperature for 36 hours before testing. Densities of the foams were varied by varying the amounts of water and isocyanate. The formulations, foam conditions and foam properties are shown in Table I.

Examples of the invention showed an improvement in tensile strength, tear resistance, 40% compression load deflection (CLD), and CLD Modulus 65/25 over the comparative runs. The improvement in 40% CLD ranged from 48 percent to 67 percent when comparing foams of similar densities. It should be noted that the examples required a larger proportion of Catalyst K than the comparative runs.

TABLE I

| Formulation (parts by weight) | 1 | 2 | A | B |
|---|---|---|---|---|
| Amine Salt Crosslinking Agent A | 3.6 | 3.6 | — | — |
| Amine Crosslinking Agent C | — | — | 2.0 | 2.0 |
| Auxiliary Crosslinking Agent E | 0.4 | 0.4 | — | — |
| Auxiliary Crosslinking Agent F | 0.5 | 1.0 | — | — |
| Polyol G | 100 | 100 | 100 | 100 |
| Polyisocyanate I | 30.5 | 36.5 | 30.0 | 35.0 |
| Catalyst K | 1.25 | 1.1 | 0.3 | 0.3 |
| Catalyst L | — | — | 0.5 | 0.4 |
| Catalyst P | — | — | 0.15 | 0.25 |
| Cell Control Agent Q | 0.1 | 0.1 | 0.1 | 0.1 |
| Water | 2.0 | 2.5 | 2.0 | 2.5 |
| Foam Conditions | | | | |
| Cream Time, seconds | 10 | 9 | 6 | 6 |
| Rise Time, seconds | 135 | 130 | 110 | 105 |
| Foam Properties | | | | |
| Density, kg/m$^3$ | 39.0 | 34.5 | 40.0 | 35.0 |
| Tensile Strength, kg/cm$^2$ | 1.1 | 1.0 | 0.80 | 0.75 |
| Elongation, % | 160 | 155 | 180 | 170 |
| Tear Resistance, kg/cm | 0.55 | 0.50 | 0.4 | 0.4 |
| Resilience, % | 62 | 62 | 66 | 66 |
| 40% CLD, g/cm$^2$ | 34 | 30 | 23 | 18 |
| Hysteresis, % | 21 | 22 | 18 | 19 |
| CLD Modulus 65/25 | 3.1 | 3.0 | 2.7 | 2.7 |

EXAMPLES 3-7 AND COMPARATIVE RUNS C AND D

Examples 3-7 and Comparative Runs C and D illustrate molded foams prepared from hand mixed formulations. The foaming formulations were prepared as described in Examples 1 and 2 and Comparative Runs A and B. Amine Salt Crosslinking Agent A and Auxiliary Crosslinking Agent E were also used in Examples 3-7 in the same manner as Examples 1 and 2. Additional Auxiliary Crosslinking Agent F was added to the foaming formulations of the Examples. Comparative Run C employed an amine crosslinker which is diisopropanolamine, hereinafter known as Amine Crosslinking Agent D. Comparative Run D did not employ an amine crosslinking agent and neither Comparative Run C or D employed an auxiliary crosslinking agent. The polyether polyol used for Examples 3-7 and Comparative Runs C and D, hereinafter known as Polyol H, is a commercial polyether triol made by reacting glycerol with propylene oxide and ethylene oxide and end capping with ethylene oxide. Polyol H has a hydroxyl equivalent weight of 1570 and contains 60 to 80 percent primary hydroxyl groups. Polyisocyanate I was used for Examples 3-7. Comparative Runs C and D employed a polyisocyanate which was a solution of trimerized TDI in 80% (2,4-)-20% (2,6-) TDI, hereinafter known as Polyisocyanate J.

Catalyst K was used for Examples 3-7 and Comparative Runs C and D. Catalyst L was used for Comparative Runs C and D. For Examples 3-7, additionally bis-2(N,N-dimethylaminoethyl)ether, hereinafter known as Catalyst M, was added. For Comparative Runs C and D, additionally N-ethyl morpholine, hereinafter known as Catalyst N, was added. Examples 3-7 contained Cell Control Agent Q, while Comparative Runs C and D contained a phenylmethylsiloxane, hereinafter known as Cell Control Agent R.

After mixing of the components was completed, each foaming formulation was poured into a 10 × 35 × 35 centimeter aluminum mold heated to 45°-50° C. Each foam sample was removed after 10 minutes in the mold. Formulations, foam conditions and foam properties are shown in Table II.

Examples 3-7 have higher resilience, lower hysteresis loss and equal or higher CLD Modulus 65/25 than Comparative Runs C and D. The high 40% CLD of Comparative Run C was obtained by employing a premium amine crosslinking agent not in wide-spread use because of its cost, as well as a special polyisocyanate and a special cell control agent which are higher cost components when compared with the corresponding components of Examples 3-7. Example 4 had the same density as Comparative Run D. The improved resilience and CLD Modulus 65/25 and lower hysteresis loss are accomplished with lower cost components than Comparative Run D.

High resiliency flexible polyurethane foam employing styrene acrylonitrile copolymer polyols had load bearing characteristics similar to Comparative Run D, when measured on foams having the same density. Polyisocyanate J employed in Comparative Runs C and D and the copolymer polyols require special storage conditions to prevent contamination of other materials.

TABLE II

| Formulations (parts by weight) | 3 | 4 | 5 | 6 | 7 | C | D |
|---|---|---|---|---|---|---|---|
| Amine Salt Crosslinking Agent A | 3.9 | 4.9 | 3.9 | 3.2 | 3.9 | — | — |
| Amine Crosslinking Agent D | — | — | — | — | — | 2.0 | — |
| Auxiliary Cross- | | | | | | | |

TABLE II-continued

| Formulations (parts by weight) | 3 | 4 | 5 | 6 | 7 | C | D |
|---|---|---|---|---|---|---|---|
| linking Agent E | 0.7 | 0.1 | 0.7 | 1.1 | 0.7 | — | — |
| Auxiliary Cross-linking Agent F | 0.75 | 1.0 | 0.75 | 0.5 | 0.75 | — | — |
| Polyol H | 100 | 100 | 100 | 100 | 100 | 100 | 100 |
| Polyisocyanate I | 41.5 | 42.0 | 41.5 | 36.0 | 36.5 | — | — |
| Polyisocyanate J | — | — | — | — | — | 49.0 | 49.0 |
| Catalyst K | 1.25 | 1.25 | 1.25 | 1.0 | 1.25 | 0.3 | 0.4 |
| Catalyst L | — | — | — | — | — | 0.5 | 0.5 |
| Catalyst M | 0.15 | 0.15 | 0.20 | 0.15 | 0.15 | — | — |
| Catalyst N | — | — | — | — | — | 0.5 | 0.5 |
| Cell Control Agent Q | 0.1 | 0.1 | 0.05 | 0.1 | 0.1 | — | — |
| Cell Control Agent R | — | — | — | — | — | 1.0 | 1.0 |
| Water | 3.0 | 3.0 | 3.0 | 2.5 | 2.5 | 3.1 | 3.1 |
| Foam Conditions | | | | | | | |
| Cream Time, Seconds | 9 | 8 | 9 | 8 | 8 | 6 | 6 |
| Rise Time, Seconds | 90 | 95 | 90 | 85 | 90 | 90 | 95 |
| Foam Properties | | | | | | | |
| Density, kg/m$^3$ | 42 | 42 | 42 | 50 | 49.5 | 46 | 42 |
| Tensile Strength, kg/cm$^2$ | 1.1 | 0.9 | 1.1 | 1.3 | 1.2 | 1.2 | 1.2 |
| Elongation, % | 165 | 140 | 135 | 165 | 155 | 135 | 155 |
| Tear Resistance, kg/cm | 0.5 | 0.5 | 0.5 | 0.5 | 0.5 | 0.6 | 0.6 |
| Resilience, % | 63 | 62 | 62 | 62 | 62 | 58 | 57 |
| 40% CLD, g/cm$^2$ | 30.5 | 33 | 32 | 36 | 37.5 | 36.5 | 30.5 |
| Hysteresis, % | 20 | 21 | 22 | 19 | 20 | 27 | 25 |
| CLD Modulus 65/25 | 3.0 | 3.1 | 3.1 | 3.3 | 3.1 | 3.0 | 3.0 |

EXAMPLES 8-15

Examples 8-15 illustrate high resiliency flexible slab stock polyurethane foams prepared on large scale production type foam machines. Examples 8-14 employed a Viking foam head and Example 15 employed a Hennecke UBT foam head. The foaming formulations for all examples contained Auxiliary Crosslinking Agent E, Polyol H, Polyisocyanate I, Cell Control Agent Q, and Catalyst P. Examples 8-10 employed an aqueous solution of Amine Salt Crosslinking Agent A prepared as described in Examples 1 and 2. Examples 11 and 15 employed an aqueous solution of an amine salt crosslinking agent prepared from isophoronediamine and adipic acid hereinafter known as Amine Salt Crosslinking Agent B, in the same manner as described for Amine Salt Crosslinking Agents A and B. Examples 12-14 employed both Amine Salt Crosslinking Agents A and B. Examples 8-11 and 15 additionally employed a Catalyst M. Examples 12-14 additionally employed Catalyst L. Example 15 employed solid 100% triethylenediamine, hereinafter known as Catalyst O. Formulations, foam conditions, and foam properties are shown in Table III.

TABLE III

| Formulations (parts by weight) | 8 | 9 | 10 | 11 | 12 | 13 | 14 | 15 |
|---|---|---|---|---|---|---|---|---|
| Amine Salt Crosslinking Agent A | 2.9 | 2.9 | 2.9 | — | 2.4 | 2.4 | 2.4 | — |
| Amine Salt Crosslinking Agent B | — | — | — | 3.3 | 0.5 | 0.5 | 0.5 | 3.0 |
| Auxiliary Crosslinking Agent E | 0.6 | 0.6 | 0.6 | 1.2 | 0.6 | 0.6 | 0.6 | 1.0 |
| Polyol H | 100 | 100 | 100 | 100 | 100 | 100 | 100 | 100 |
| Polyisocyanate I | 30 | 30 | 30 | 31 | 30 | 30 | 30 | 36 |
| Catalyst K | 0.4 | 0.4 | 0.4 | 0.75 | 0.75 | 0.75 | 0.75 | — |
| Catalyst L | — | — | — | — | 0.5 | 0.5 | 0.5 | — |
| Catalyst M | 0.2 | 0.2 | 0.2 | 0.2 | — | — | — | 0.1 |
| Catalyst O | — | — | — | — | — | — | — | 0.3 |
| Catalyst P | 0.25 | 0.2 | 0.15 | 0.2 | 0.25 | 0.2 | 0.15 | 0.3 |
| Cell Size Control Agent Q | 0.4 | 0.3 | 0.2 | 0.4 | 0.4 | 0.3 | 0.2 | 0.2 |
| Water | 2.0 | 2.0 | 2.0 | 2.0 | 2.0 | 2.0 | 2.0 | 2.5 |
| Foam Conditions | 8 | 9 | 10 | 11 | 12 | 13 | 14 | 15 |
| Polyol throughput, kg/min. | 12 | 12 | 12 | 12 | 12 | 12 | 12 | 50 |
| Polyol/TDI temp. °C. | 20/20 | 20/20 | 20/20 | 20/20 | 20/20 | 20/20 | 20/20 | 22/22 |
| Stirrer, rpm | 3600 | 3600 | 3600 | 3600 | 3700 | 3700 | 3700 | 3000 |
| Air at 30 psi, 1/min. | 1.0 | 1.0 | 1.0 | 0.85 | 0.85 | 0.85 | 0.85 | 0.7 |
| Conveyor speed, m/min. | 1.6 | 1.5 | 1.5 | 1.7 | 1.6 | 1.6 | 1.6 | 3.1 |
| Conveyor angle, ° | 5 | 5 | 5 | 5 | 5 | 5 | 5 | 5 |
| Cream Time, seconds | 9-10 | — | — | 8 | 8 | — | — | 7 |
| Rise Time, seconds | — | 140 | — | — | — | 135 | — | 135 |
| Foam Properties | | | | | | | | |
| Density, kg/m$^3$ | 42 | 42 | 41.5 | 30 | 41 | 41 | 40 | 36 |
| Tensile Strength, kg/cm$^2$ | 0.75 | 0.7 | 0.7 | 1.2 | 0.85 | 0.85 | 0.9 | 0.8 |
| Elongation, % | 145 | 130 | 120 | 250 | 170 | 180 | 160 | 160 |
| Tear Resistance, kg/cm | 0.4 | 0.3 | 0.3 | 0.5 | 0.35 | 0.3 | 0.3 | 0.35 |
| Resilience, % | 61 | 62 | 60 | 59 | 59 | 60 | 61 | 61 |
| Compression Set, % | 3.5 | 4 | 4 | 9 | 10 | 10 | 8 | 6 |
| 40% CLD, g/cm$^2$ | 35 | 39 | 38 | 30.5 | 32 | 33.5 | 33.5 | 30.5 |
| ILD, lbs at 25% | 35.5 | 40 | 39 | 30 | 33.5 | 33.5 | 34 | 32 |
| Hysteresis, % | 22 | 22 | 22 | 22 | 22 | 22 | 22 | 22 |

TABLE III-continued

| CLD Modulus 65/25 | 2.75 | 2.8 | 2.75 | 2.9 | 2.8 | 2.8 | 2.8 | 2.7 |

There was no shrinkage in any of the foams after cure and the foams were easy to crush after three days. Combinations of catalysts were used at varying concentrations to illustrate in the examples that a variety of foaming formulations will produce flexible foams having commercially desirable properties. The amine salt crosslinking agents exhibited no catalytic effect of their own. Catalyst levels for the examples were higher than for the comparative runs. The variation in foam properties in general follows the expected pattern for one shot flexible polyurethane foams.

Examples of foaming formulations employing amine salt crosslinking agents in general exhibited longer cream times and rise times for the comparative runs. This supports the concept that the amine salt crosslinking agent reacts later in the reaction when the heat of the reaction dissociates the amine salt. The amine salts did not have the characteristic odor of the amine. However, during the later stages of the foaming reaction, the characteristic odor was again detected. This observation also supports the concept of the amine salt as a latent crosslinking agent.

EXAMPLES 16–17 AND COMPARATIVE RUNS E AND F

Examples 16 and 17 were aimed at proving usefulness of amine salts for conventional flexible foams. The polyol used in Examples 16–17 and Comparative Runs E and F, hereinafter known as Polyol T, was a commercial polyether triol made by reacting glycerol with propylene oxide and ethylene oxide in a mixed feed. Polyol T has a hydroxyl equivalent weight of 1360.

The polyisocyanate used was Polyisocyanate I. Catalysts K, L, and M were used again as blowing catalysts. A polyoxyalkylenepolydimethylsiloxane copolymer, hereinafter known as Cell Control Agent U was used in both examples and both comparative runs. Catalyst P, the polymerization catalyst, was also used for both examples and comparative runs.

In these examples the aqueous solution of the amine salt crosslinking agent, the auxiliary crosslinking agent, and the tertiary amine catalysts were mixed into the water stream. The stannous octoate catalyst and the cell control agent were mixed into the polyol.

While stirring the polyol side at a high speed, the water stream and the polyisocyanate were added simultaneously. Then the foaming formulation was stirred to several more seconds. The foaming formulation was then poured into an open container and allowed to rise.

Densities of these foams were varied by varying the amounts of water and isocyanate. Formulations, foam conditions, and foam properties are shown in Table IV.

TABLE IV

| Formulation (parts by weight) | 16 | 17 | E | F |
|---|---|---|---|---|
| Amine Salt Crosslinking Agent A | 3.6 | 3.6 | — | — |
| Auxiliary Crosslinking Agent E | 0.4 | 0.4 | — | — |
| Polyol T | 100 | 100 | 100 | 100 |
| Polyisocyanate I | 42.5 | 52.5 | 40.5 | 50.5 |
| Catalyst K | — | — | 0.35 | 0.30 |
| Catalyst L | 0.5 | 0.5 | — | — |
| Catalyst M | 0.15 | 0.12 | — | — |
| Cell Control Agent U | 0.7 | 0.8 | 0.7 | 0.8 |
| Water | 3.0 | 4.0 | 3.0 | 4.0 |
| Catalyst P | 0.10 | 0.10 | 0.125 | 0.125 |
| Foam Conditions | | | | |

TABLE IV-continued

| Formulation (parts by weight) | 16 | 17 | E | F |
|---|---|---|---|---|
| Cream Time, seconds | 10 | 10 | 8 | 8 |
| Rise Time, seconds | 115 | 100 | 125 | 115 |
| Foam Properties | | | | |
| Density, kg/m$^3$ | 30.0 | 24.0 | 31.0 | 25.0 |
| 40% CLD g/cm$^2$ | 33.0 | 30.5 | 33.0 | 30.0 |
| CLD Modulus 65/25 | 2.5 | 2.4 | 2.1 | 2.0 |

Examples of the invention show an improvement in CLD modulus 65/25 at same hardness over the comparative runs. Improvement in modulus was 20%.

EXAMPLE 18 AND COMPARATIVE RUN G

Example 18 and Comparative Run G illustrate foams prepared from hand mixed formulations. Example 18 used Amine Salt Crosslinking Agent B, Polyol H, Polyisocyanate I, Catalyst K, Cell Control Agent Q and water. Comparative Run G replaced Amine Salt Crosslinking Agent B with an amine salt crosslinking agent prepared from stoichiometric quantities of hexamethylenediamine and adipic acid, hereinafter known as Amine Salt Crosslinking Agent V. In Example 18 and Comparative Run G, an aqueous solution of the amine salt crosslinking agent, the polyol, the catalyst and the cell control agent were blended together until the components were well dispersed. Then the polyisocyanate was added and the formulation stirred for several more seconds. Each formulation was then poured into an open container and the foam allowed to rise. The foam was cured at room temperature for 36 hours before testing. The formulations and foam properties are shown in Table V.

Example 18 shows a considerable improvement in the 40% compression load deflection (CLD) over Comparative Run G.

TABLE V

| Formulations (parts by weight) | 18 | G |
|---|---|---|
| Amine Salt Crosslinking Agent B | 2.0 | — |
| Amine Salt Crosslinking Agent V | — | 2.0 |
| Polyol H | 100 | 100 |
| Polyisocyanate I | 35.0 | 35.0 |
| Catalyst K | 1.0 | 1.0 |
| Cell Control Agent Q | 0.1 | 0.1 |
| Water | 2.5 | 2.5 |
| Foam Properties | | |
| Density, kg/m$^3$ | 35 | 35 |
| 40% CLD, g/cm$^2$ | 22 | 15 |

I claim:

1. In a process for producing a flexible polyurethane foam, which process comprises reacting in one step a polyether polyol and a crosslinking agent with a polyisocyanate in the presence of a catalyst and a blowing agent, the improvement of employing as at least a major proportion of the crosslinking agent a soluble amine salt obtained by reacting a cycloaliphatic polyamine having at least two primary amine groups with approximately the stoichiometric equivalent amount of a carboxylic acid.

2. The process of claim 1 wherein the polyamine is an aminocyclohexanemethanamine.

3. The process of claim 2 wherein the polyamine is isophoronediamine.

4. The process of claim 1 wherein the carboxylic acid contains from two to thirty carbon atoms.

5. The process of claim 4 wherein the carboxylic acid contains from three to ten carbon atoms.

6. The process of claim 5 wherein the carboxylic acid is an aliphatic dicarboxylic acid containing from four to six carbon atoms.

7. The process of claim 6 wherein the carboxylic acid is succinic acid, adipic acid, or mixtures thereof.

8. The process of claim 1 wherein the amine salt is employed in amounts of from 0.1 to 10 parts by weight per 100 parts by weight of polyol.

9. The process of claim 8 wherein the amine salt is employed in amounts of from 1 to 4 parts by weight per 100 parts by weight of polyol.

10. A flexible polyurethane foam prepared by the process of claim 1.

* * * * *

UNITED STATES PATENT AND TRADEMARK OFFICE
CERTIFICATE OF CORRECTION

PATENT NO. : 4,136,241
DATED : January 23, 1979
INVENTOR(S) : Rudolf Ammann

It is certified that error appears in the above-identified patent and that said Letters Patent are hereby corrected as shown below:

Column 1, lines 43-44, delete "diminishes" and insert --diamines--.

Column 3, line 35, delete "polyester" and insert --polyether--.

Column 8, Table III, under heading 11, third section, line 1, delete "30" and insert --39--.

Column 9, line 18, after "times" second occurrence, insert -- than --.

Signed and Sealed this

Third Day of July 1979

[SEAL]

Attest:

LUTRELLE F. PARKER
Attesting Officer    Acting Commissioner of Patents and Trademarks